(12) United States Patent
Forkey et al.

(10) Patent No.: US 7,385,772 B2
(45) Date of Patent: Jun. 10, 2008

(54) OPTICAL DEVICE WITH LENS POSITIONING AND METHOD OF MAKING THE SAME

(75) Inventors: Richard E. Forkey, Westminster, MA (US); William P. Barnes, Acton, MA (US); Robert N. Ross, Gardner, MA (US); Joseph N. Forkey, Princeton, MA (US)

(73) Assignee: Precision Optics Corporation, Gardner, MA (US)

( * ) Notice: Subject to any disclaimer, the term of this patent is extended or adjusted under 35 U.S.C. 154(b) by 381 days.

(21) Appl. No.: 10/809,198

(22) Filed: Mar. 25, 2004

(65) Prior Publication Data

US 2004/0242965 A1 Dec. 2, 2004

(51) Int. Cl.
*G02B 7/02* (2006.01)
*G02B 23/24* (2006.01)

(52) U.S. Cl. .............. 359/819; 359/808; 359/809; 359/811; 359/362; 396/349; 600/130; 600/133; 600/138; 600/160; 600/167; 385/33; 42/120

(58) Field of Classification Search ............... 359/808, 359/809, 811, 819, 820, 434, 435, 362, 503, 359/823, 825, 642; 600/130, 133, 138, 160, 600/161, 167, 476; 385/15, 33, 53, 81; 396/25, 396/349, 448, 72, 73; 351/154, 44; 356/247; 42/120; 2/440
See application file for complete search history.

(56) References Cited

U.S. PATENT DOCUMENTS

| 1,587,131 | A | | 6/1926 | Tillyer |
| 3,415,595 | A | * | 12/1968 | Nelson .................... 351/44 |
| 3,949,482 | A | | 4/1976 | Ross |
| 4,148,550 | A | | 4/1979 | MacAnally |
| 4,776,670 | A | | 10/1988 | Kessels et al. |
| 4,850,674 | A | * | 7/1989 | Hasselskog ................ 359/820 |
| 5,177,641 | A | * | 1/1993 | Kobayashi et al. ......... 359/820 |
| 5,305,406 | A | | 4/1994 | Rondeau |
| 5,493,452 | A | | 2/1996 | Hoshino et al. |
| 5,557,474 | A | * | 9/1996 | McCrary ................... 359/820 |
| 5,757,559 | A | * | 5/1998 | Nomura et al. ............. 359/819 |
| 5,810,713 | A | | 9/1998 | Rondeau et al. |

(Continued)

FOREIGN PATENT DOCUMENTS

DE 3431631 A 3/1996

(Continued)

*Primary Examiner*—Loha Ben
(74) *Attorney, Agent, or Firm*—George A. Herbster

(57) ABSTRACT

Optical devices which accurately position optical elements and methods for producing such optical devices. Each optical element is carried by a support on an axis that has portions plastically deformed to overlap portions of the faces of the optical element adjacent an intermediate peripheral surface. This configuration locks the optical element axially in the support and produces a positive rigid retaining structure for each optical element.

21 Claims, 12 Drawing Sheets

U.S. PATENT DOCUMENTS

| | | |
|---|---|---|
| 5,969,887 A | 10/1999 | Hagimori et al. |
| 5,999,344 A | 12/1999 | Wulfsberg et al. |
| 6,078,439 A * | 6/2000 | Silhengst et al. ........... 359/819 |
| 6,108,145 A * | 8/2000 | McCrary .................... 359/820 |
| 6,122,114 A * | 9/2000 | Sudo et al. ................. 359/819 |
| 6,201,649 B1 | 3/2001 | Rudischhauser et al. |
| 6,263,133 B1 | 7/2001 | Hamm |
| 6,398,723 B1 | 6/2002 | Kehr et al. |
| 6,441,976 B1 * | 8/2002 | Okorocha ................... 359/820 |
| 6,462,895 B2 | 10/2002 | Hunter |
| 6,471,640 B1 | 10/2002 | Frische et al. |
| 6,487,440 B2 | 11/2002 | Deckert et al. |

FOREIGN PATENT DOCUMENTS

| | | |
|---|---|---|
| EP | 0292602 | 8/1987 |
| GB | 1556476 | 11/1979 |
| WO | WO 99/05959 | 2/1999 |

* cited by examiner

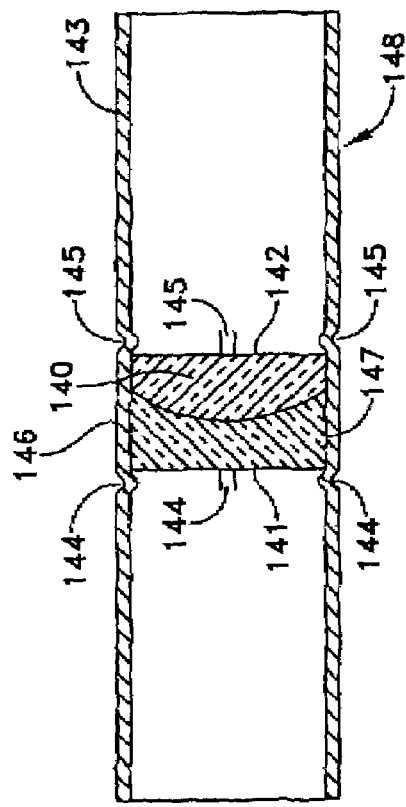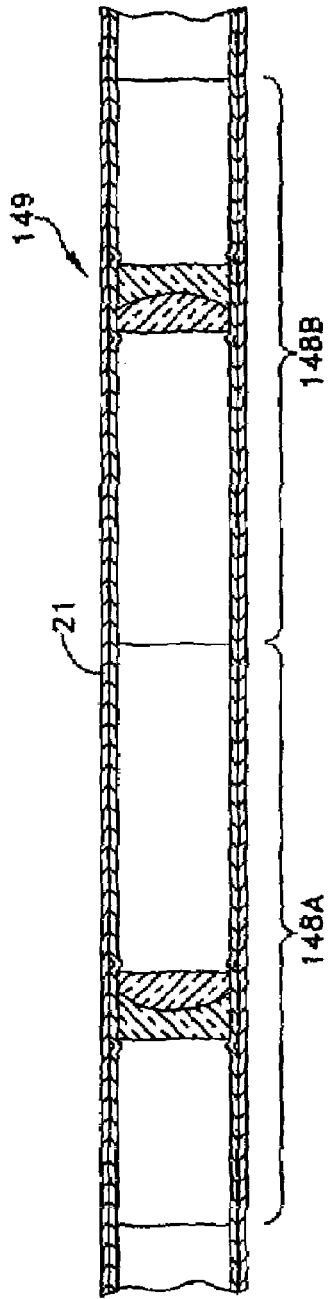

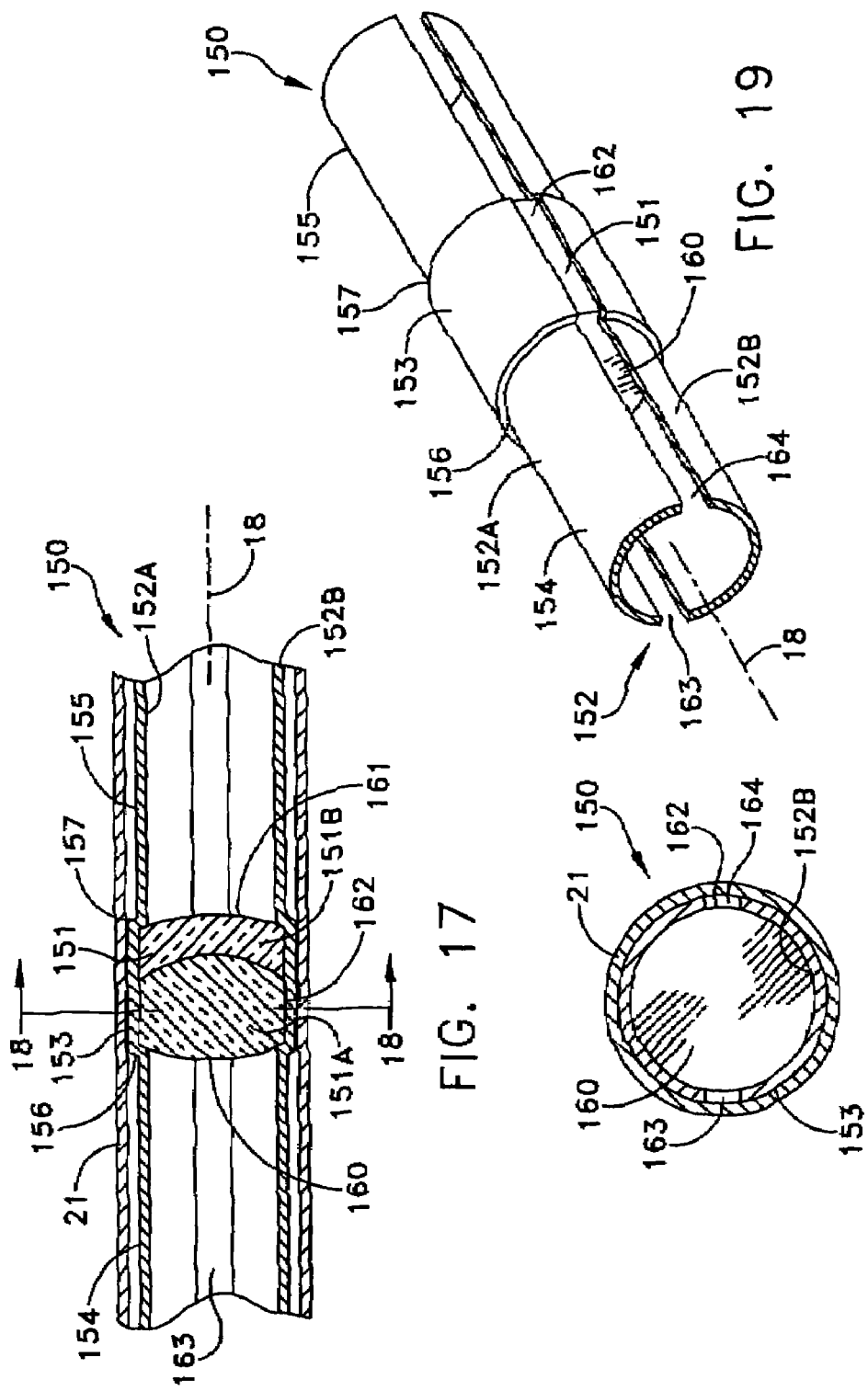

OPTICAL DEVICE WITH LENS POSITIONING AND METHOD OF MAKING THE SAME

BACKGROUND OF THE INVENTION

1. Field of the Invention

This invention generally relates to the manufacturing and construction of optical devices and more specifically to the positioning of lenses spaced along an axis, such as an optical housing.

2. Description of Related Art

In a number of optical devices it is important to position lenses or other optical elements accurately with respect to each other along a device axis. Rigid endoscopes are an example. Rigid endoscopes are elongate optical devices in which a plurality of axially spaced optical elements including lenses relay an image from an objective to an eyepiece along a device axis that is also the optical axis. It is important that the axial spacing between individual optical elements, such as the elements in the relay lens system, be maintained accurately in a wide variety of environmental conditions including widely varying temperature conditions as encountered during autoclaving and conditions of mechanical shock. Furthermore it is often important to maintain all the optical elements in a sealed environment to prevent moisture from accumulating along an optical path in order to maintain image quality.

A number of approaches for providing axial positioning of optical elements have been disclosed in the prior art. Some use a process of deforming certain structures and are disclosed in the following references: GB1556475 (1979) Epworth et al.

| | | |
|---|---|---|
| 1,587,131 | (1926) | Tillyer |
| 3,949,482 | (1976) | Ross |
| 4,776,670 | (1988) | Kessels et al. |
| 5,305,406 | (1994) | Rondeau |
| 5,493,452 | (1996) | Hoshino et al. |
| 5,810,713 | (1998) | Rondeau et al. |
| 5,969,887 | (1999) | Hagimori et al. |
| 6,201,649 | (2001) | Rudischhauser et al. |
| 6,263,133 | (2001) | Hamm |
| 6,398,723 | (2002) | Kehr et al. |
| 6,462,895 | (2002) | Hunter |
| 6,487,440 | (2002) | Deckert et al. |

Generally speaking these methods deform an outer tube in an attempt to position each optical element along an optical axis. In some approaches the resulting structure merely engages the periphery of the lenses and relies on sliding friction to maintain accurate location. However, in many situations shock forces can overcome the sliding friction exerted in such devices so an optical element can be displaced. In others a tube is penetrated to provide a tab that blocks motion of the lens axially. Piercing the outer tube destroys any ability to isolate the optical element from the environment surrounding the optical system, particularly in the case of endoscopes that require autoclaving.

What is needed is an optical device and a method for manufacturing an optical device with positive positioning of individual optical elements without any need to penetrate a supporting structure.

SUMMARY

Therefore it is an object of this invention to provide an optical device in which the optical elements are fixed axially with precision.

Another object of this invention is to provide an optical device that assures the axial positioning of optical elements even during autoclaving.

Yet another object of this invention is to provide a method for manufacturing an optical device with optical elements fixed axially with precision.

Still another object of this invention is to provide a method of manufacturing an optical device that assures the accurate positioning of optical elements within a housing during assembly and during use.

In accordance with this invention an optical device characterized by an axis includes an optical element on the axis that has first and second faces and an intermediate peripheral surface. An optical element support defines a positive seat for the optical element. A first portion at an intermediate axial location of the support means engages the peripheral surface. Second integral portions adjacent opposite ends of the first portion engage each of the first and second faces adjacent the peripheral surface whereby the optical element is locked in the optical device to limit motion along the axis.

BRIEF DESCRIPTION OF THE DRAWINGS

The various objects, advantages and novel features of this invention will be more fully apparent from a reading of the following detailed description in conjunction with the accompanying drawings in which like reference numerals refer to like parts, and in which:

FIG. 15 is a longitudinal cross-section of another embodiment of an optical module incorporating this invention;

FIG. 16 is a longitudinal cross section that depicts an optical device utilizing the optical element of FIG. 15;

FIG. 17 is a longitudinal cross section of an optical device constructed in accordance with another embodiment of this invention;

FIG. 18 is a transverse cross sectional view taken along lines 18-18 in FIG. 17; and FIG. 19 is a perspective view of the optical device depicted in FIG. 17.

DESCRIPTION OF ILLUSTRATIVE EMBODIMENTS

Figure 1:
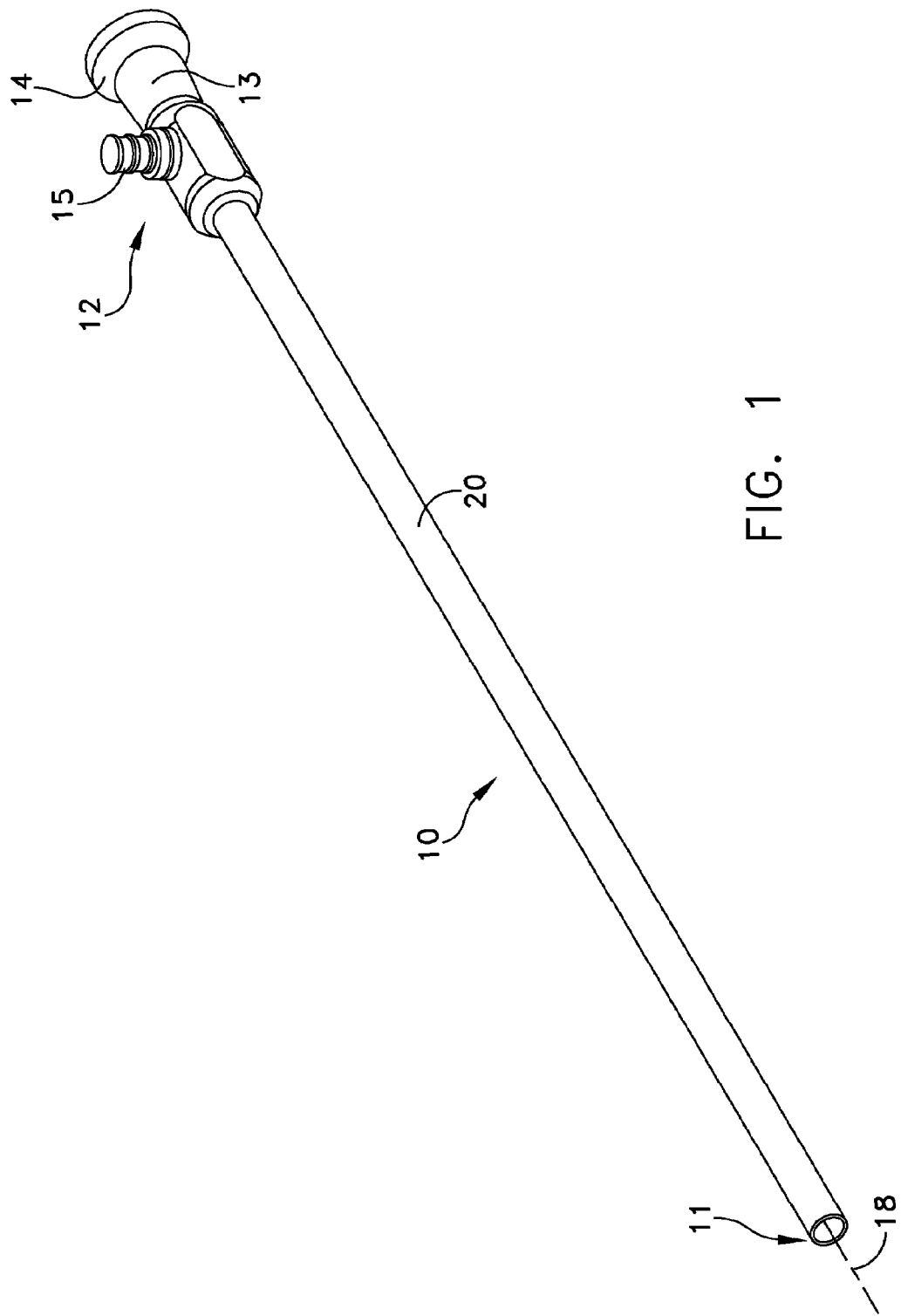
FIG. 1 is a perspective view of an endoscope as an example of an optical device to which this invention can be applied.

FIG. 1 depicts an endoscope 10 as it appears to medical personnel for use. It extends between a distal end 11, the end closest to the object to be imaged, and a proximal end 12, the end closest to the person using the device. This view depicts an optical body 13 with an eyecup 14 through which an individual views the image. A fiber post 15 receives an output connection from an illumination source thereby to provide light for transmission through optical fiber to illuminate the object being imaged. In this specific implementation the device axis 18 is the optical axis.

Figure 2:
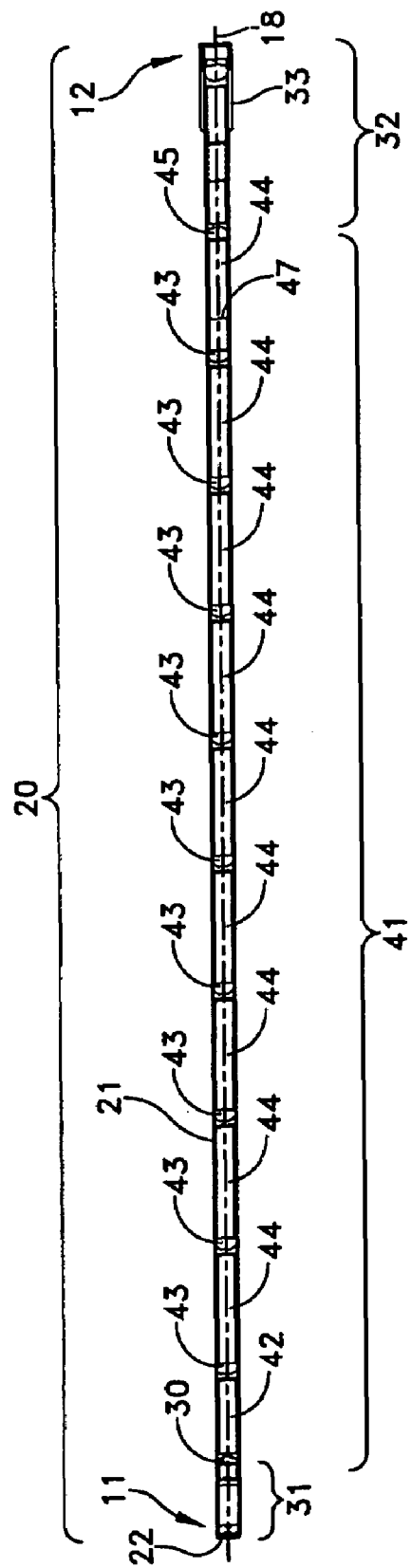
FIG. 2 is a cross-section view of an optical device that forms a part of the endoscope of FIG. 1 and that is constructed in accordance with this invention.

The endoscope 10 also houses an optical device 20 as shown in FIG. 2 that extends between the distal end 11 and proximal end 12. The optical device 20 includes a tubular sheath 21 that extends along the optical axis 18. In this embodiment, a distal window 22 seals the tubular sheath 21 at the distal end 11. The distal window 22 can be formed of any material, such as a sapphire window, that will withstand autoclaving temperatures.

An optical objective 31 is proximately displaced from the window 22 along the axis 18. As known, the optical objective 31 forms an image of an object lying on an extension of the optical axis 18. The optical objective 31 may have any of a variety of embodiments.

An eyepiece 32 of the optical device 20 extends into the tubular sheath 21 from the proximal end 12. An axially extending collar 33 is soldered or brazed to the tubular sheath 21. Optical elements that form the eyepiece can include an aperture/spacer, an eye lens or a retainer or some combination of these or other optical elements. The eyepiece 32 is one example of an optical element that can convey an image for a human eye or some other form of optical viewing device, such as a video viewing system, known in the art.

A third optical element set forms a relay lens system 41 intermediate the optical objective 31 and the eyepiece 32. As known, such a relay lens system transfers an image from the optical objective 31 to the eyepiece 32. A first spacer 42 positions a first relay lens element, such as a doublet lens 43, relative to the optical objective 31. In this specific embodiment, optical cylindrical intermediate lens spacers 44 and additional relay doublet lenses 43 constitute additional optical elements that are spaced along the optical axis 18 in order to a proximal most relay doublet lens 45; that is, the relay doublet lens 45 closest to the proximal end 12. The construction and operation of such relay lens systems are known in the art. Many modifications could be made to the specific lens and spacer configuration shown in FIG. 2.

Figure 3:
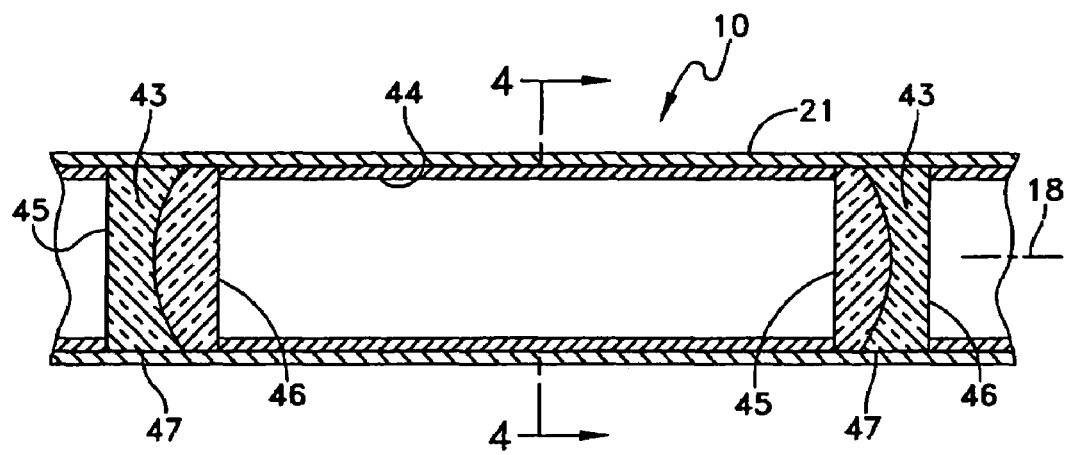
FIG. 3 is a longitudinal cross-section along a portion of the optical device shown in FIG. 2.
Figure 4:
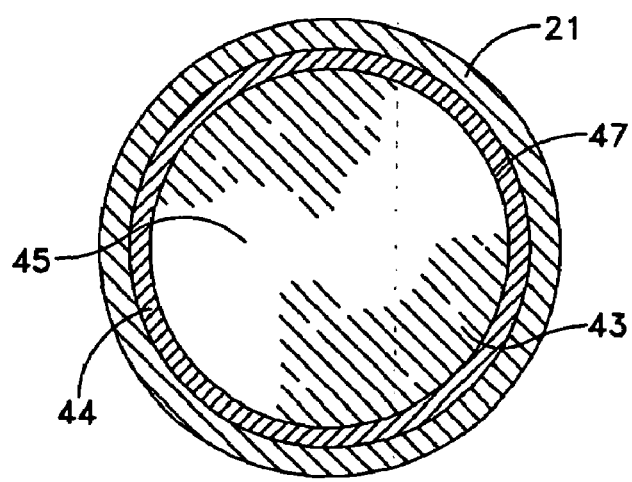
FIG. 4 is a cross-section taken along lines 4-4 in FIG. 3.

FIG. 3 is a cross-section through the optical device 20 taken along the global axis 18 in FIG. 2; FIG. 4 is a cross section through FIG. 3 normal to the axis 18. FIGS. 3 and 4 depict two doublet lenses 43 spaced along the axis 18 by a spacer 44. Each doublet lens 43 has first and second faces 45 and 46 and an intermediate peripheral surface 47. The tubular sheath 21 carries these optical elements. In accordance with this invention, the spacer 44 is only used during the construction process. As it performs no primary positioning function after the application of this invention, the spacer 44 can be thinner than a conventional spacer.

Figure 5:
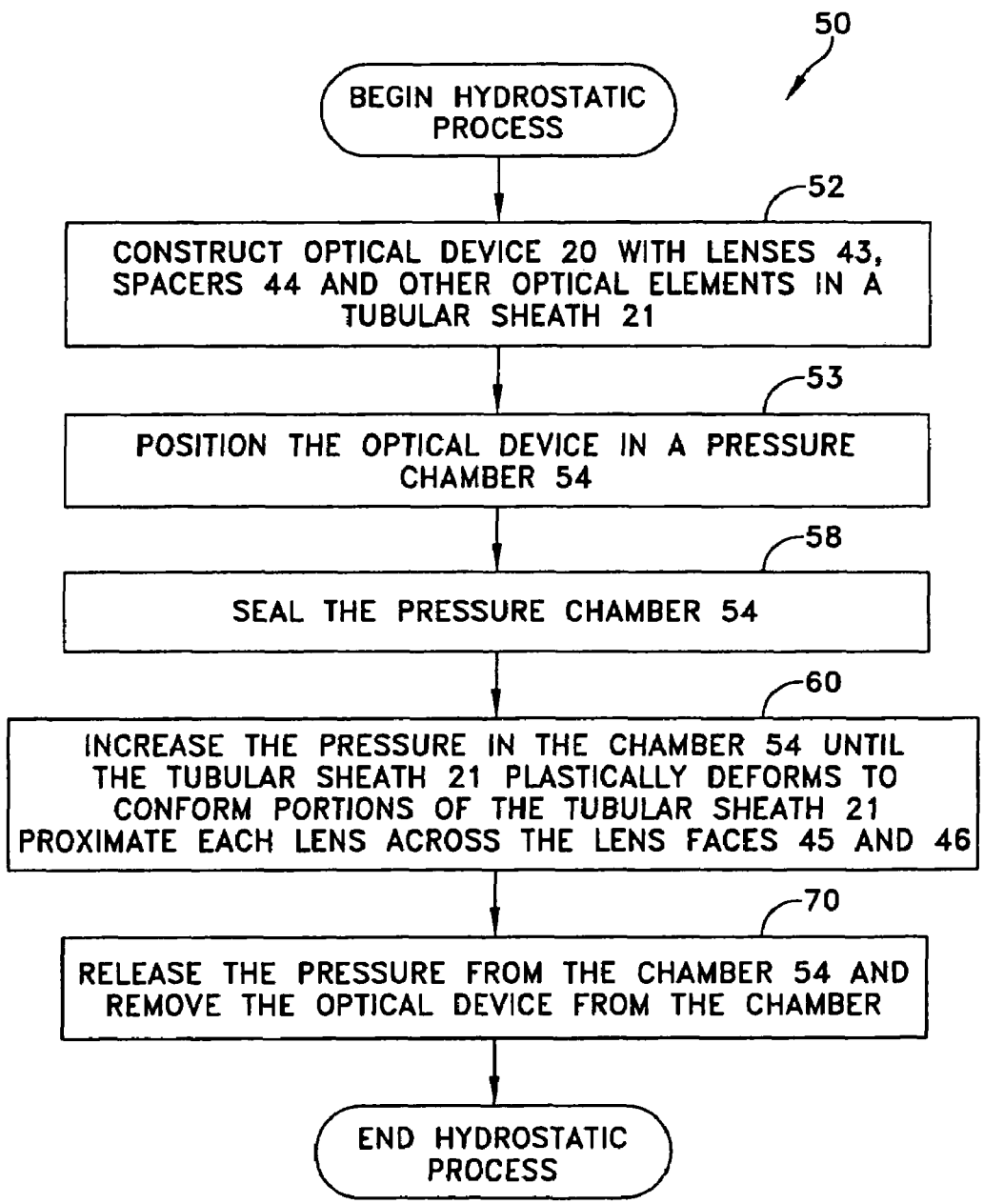
FIG. 5 is a flow chart depicting a hydrostatic process for manufacturing an optical device in accordance with this invention.

In essence this invention is directed to positioning each lens or other optical element by engaging one or both faces 45 and 46 of the optical element adjacent the peripheral surface 47 thereby to capture each such optical element along the axis 18. Different specific processes can be used. For example, FIG. 5 depicts a hydrostatic process 50 implemented using hydrostatic apparatus 51 shown in FIG. 6. More specifically, in FIG. 5 step 52 represents the various operations by which an optical device 20, such as shown in FIG. 3, is assembled with lenses, spacers and other optical elements within the tubular sheath 21. After assembly, in step 53 the optical device 20 is positioned in a pressure chamber 54 represented in FIG. 6 as a closed cylindrical structure with a sealing cap 55.

With the sealing cap 55 removed, a support structure 56 is attached to the end of the optical device 20 and it is lowered into hydraulic oil 57. After the sealing cap 55 is replaced, step 60 controls the operation of a hydraulic pump 61 to raise the pressure to a point at which a plastic deformation of the sheath 21 occurs. A pressure meter 62 monitors this pressure. A pressure relief valve 63 prevents over pressure and serves as a quick release for pressure at the end of the process. When the appropriate pressure is reached portions of the tubular sheath 21 intermediate the lens elements deform so to overlie portions of the lens faces, such as lens faces 45 and 46 in FIG. 3 and capture and lock the lens elements. This deformation conforms the portions of the sheath 21 to the geometry of the faces 45 and 46 adjacent the peripheral surface 47 to limit axial motion of the lenses 43 within the sheath 21.

Figure 7:
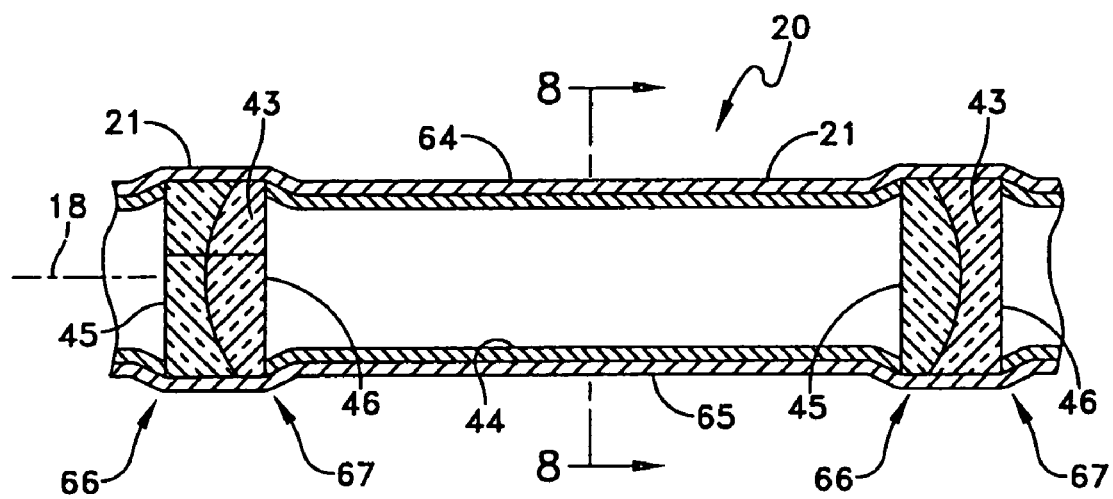
FIG. 7 is a longitudinal cross-section view of an optical device as shown in FIG. 2 after being subjected to the hydrostatic process of FIG. 5.
Figure 8:
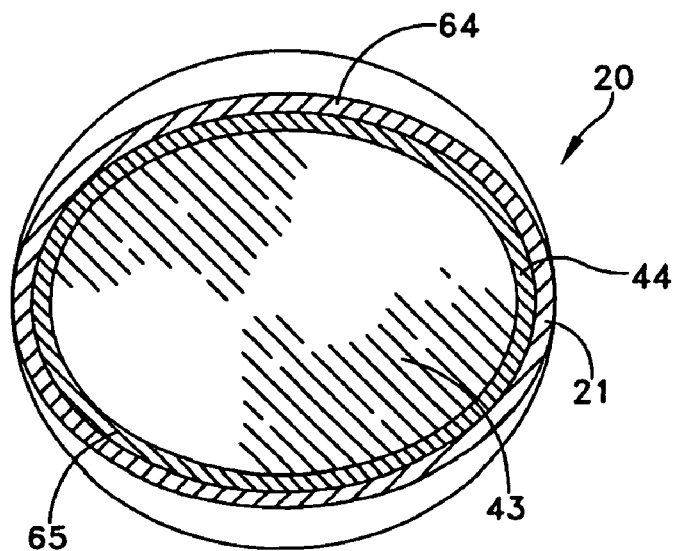
FIG. 8 is a section taken along lines 8-8 in FIG. 7.

Referring to FIGS. 7 and 8, application of the hydrostatic pressure to the exterior of the optical device 20 by the media 57 deforms unsupported portions of the tubular sheath 21 between the lens elements 43 into an ovoid shape with portions 64 and 65 lying along a major axis. The lens elements 43 prevent deformation of contiguous portions of the tubular sheath 21 that engage the peripheral surface of each of lens elements 43. Other portions of the tubular sheath 21 overlie both lens faces 45 and 46 at each lens element, such as overlayments at 66 and 67 at each of the lens elements 43. The resulting transitions to the overlayments 66 and 67 lock the lens elements 43 in place, securely positioning the lens elements within the tubular sheath 21 along the axis 18. If a spacer 44 is used, it is a thin spacer that deforms to conform to the tubular sheath 21. This provides an additional overlayment.

Figure 6:
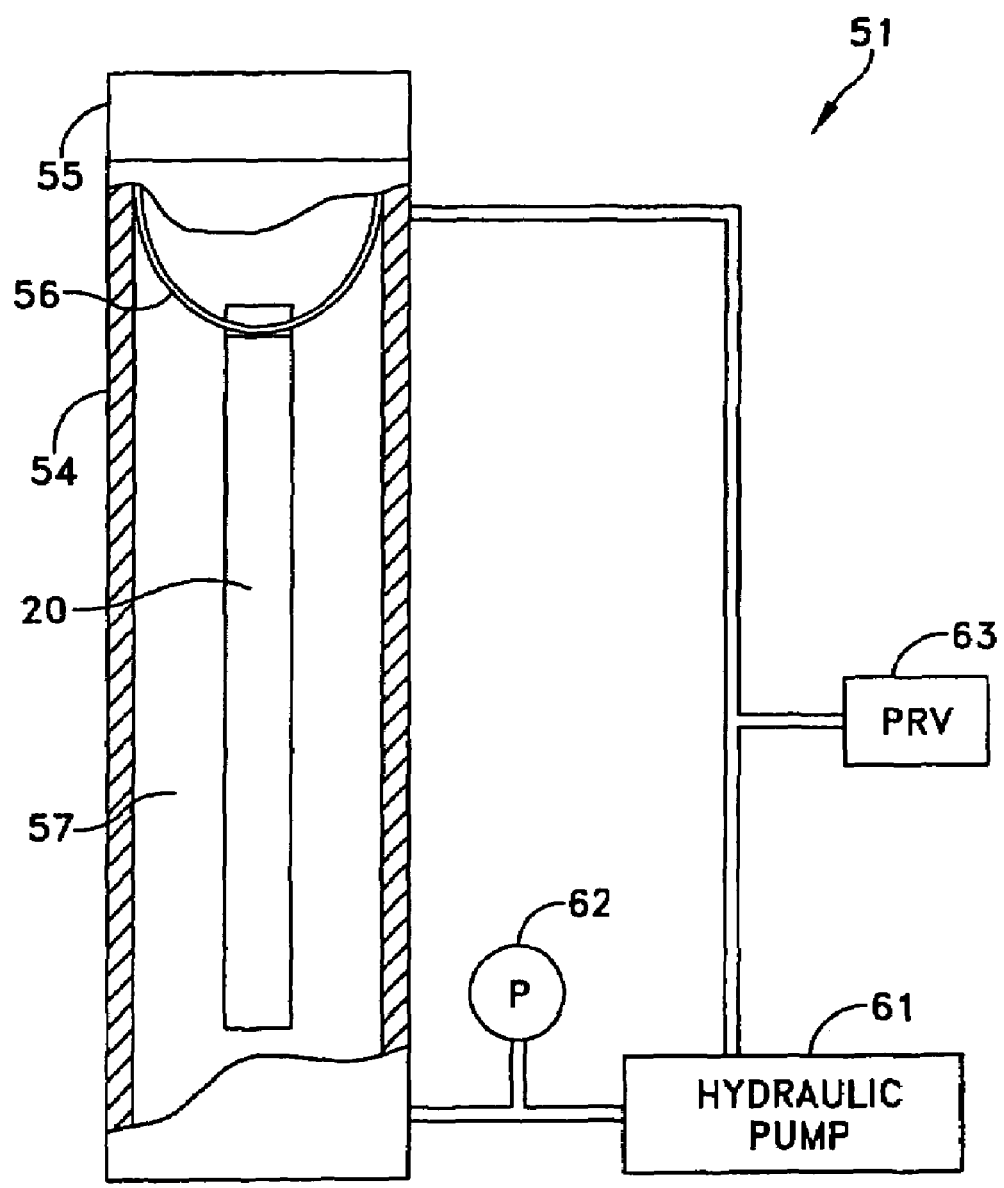
FIG. 6 is a schematic diagram partially in cross section of manufacturing apparatus for implementing the hydrostatic process in FIG. 5.

After the deformation occurs, as will be indicated by reaching a predetermined pressure, the pressure release valve 63 in FIG. 6 is activated to release the pressure in step 70 of FIG. 5. Thereafter the end cap 55 can be removed and the optical device 20 withdrawn from the chamber 54 in the configuration of FIGS. 7 and 8.

During this process the circumferential or hoop compression stress and elastic component of radial deflection for a given hydrostatic pressure can be used to evaluate and predict the pressure at which the plastic deformation occurs for a particular material and material thickness. Pressures of 1450 to 2250 PSI have been utilized to provide appropriate plastic deformation of a 3 mm diameter, 316 stainless steel tube. The steps for establishing or predicting the pressure that will cause plastic deformation for other materials, material thicknesses and diameters are within the knowledge of a person of ordinary skill in the art.

The primary control criteria for this process are to produce sufficient pressure to plastically deform a portion of the housing across a portion of the lens faces in a manner that preserves the integrity of the tube. This method and control criteria can be adapted to all types of optical devices including those subject to autoclaving or other harsh environments that require sealing. In addition, the radial deformation should be limited so that the deformed portions of the tubular sheath 21 do not extend into the field of view for the optical device 20.

Figure 9:
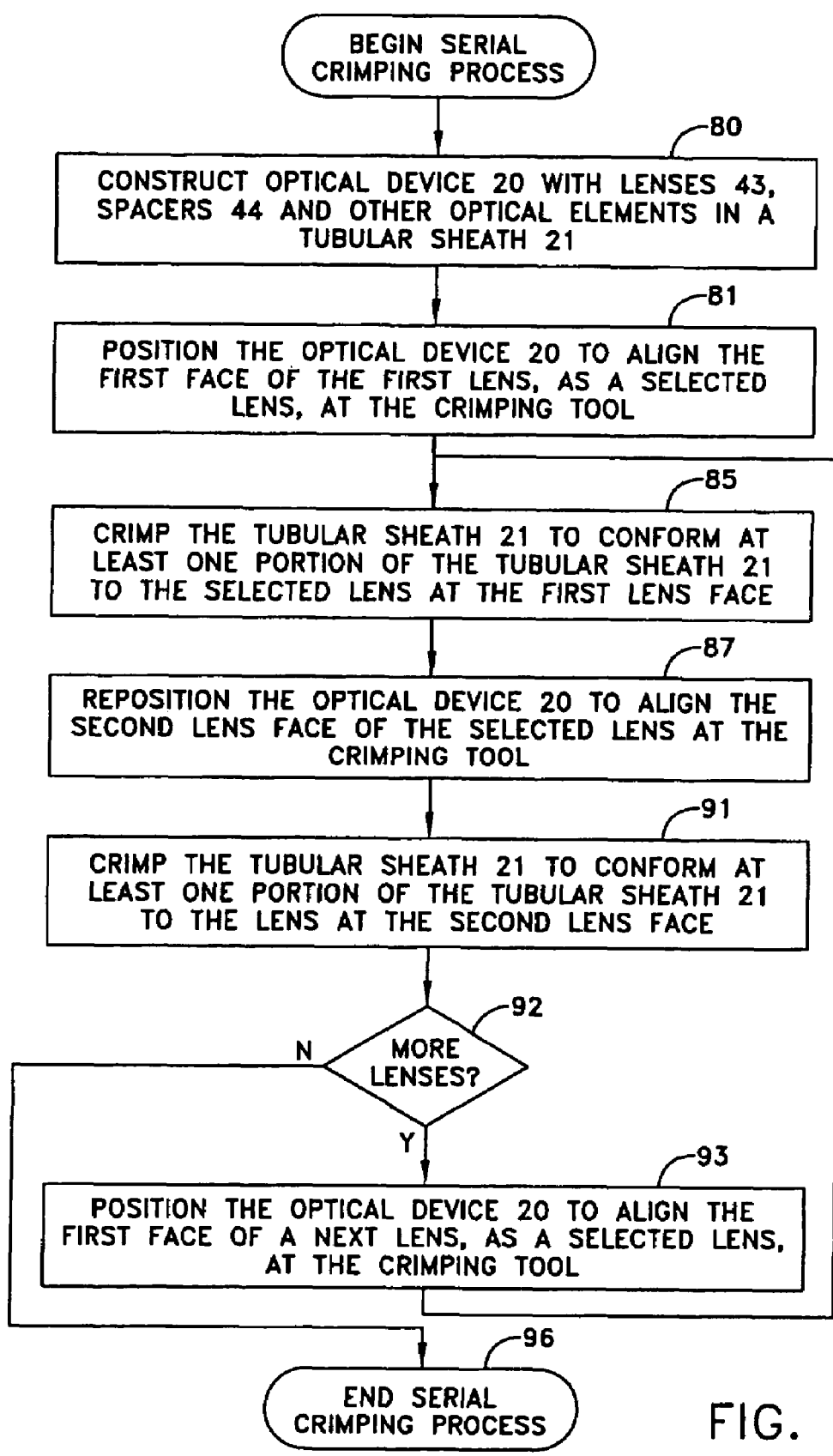
FIG. 9 is a flow diagram depicting a serial crimping process for manufacturing an optical device in accordance with this invention.
Figure 10:
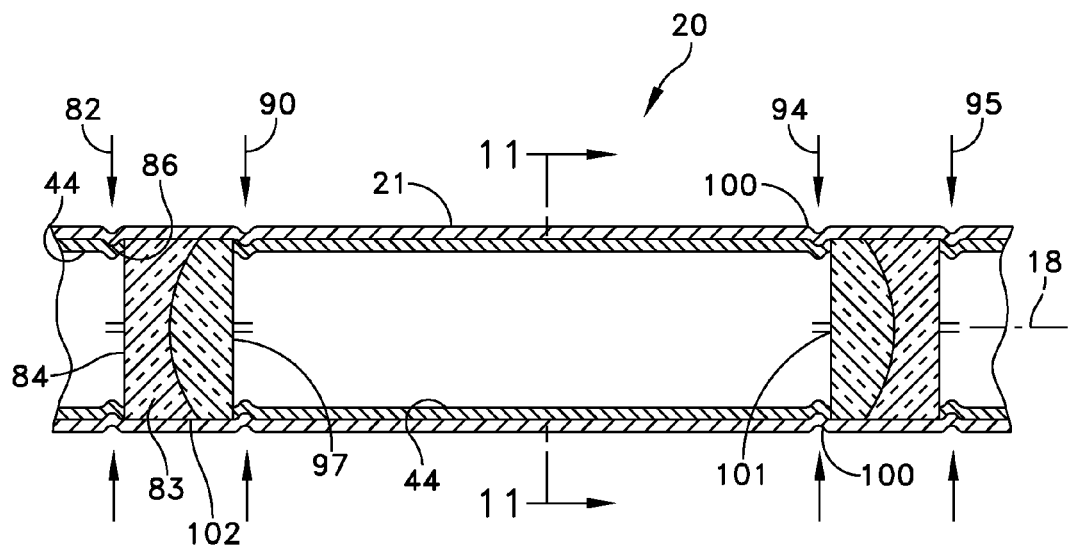
FIG. 10 is a longitudinal cross-sectional view of the optical device as shown in FIG. 2 after being subjected to the serial crimping process of FIG. 9.
Figure 11:
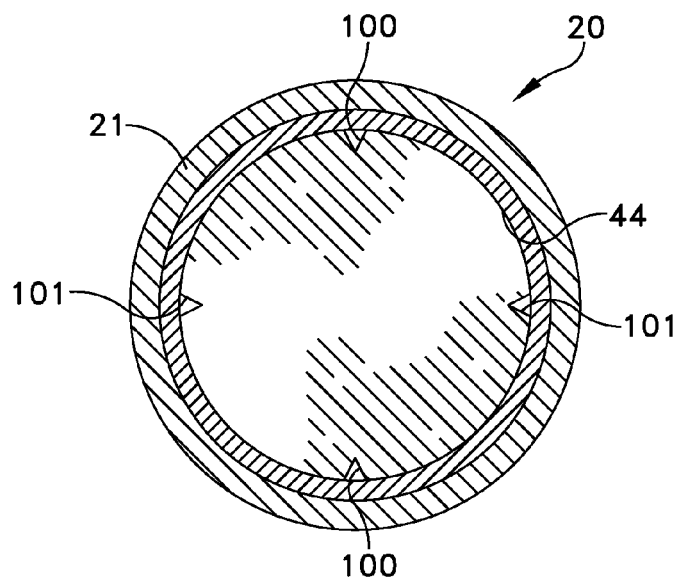
FIG. 11 is a section taken along lines 11-11 in FIG. 10.

FIGS. 9 through 11 depict an alternative to the foregoing hydrostatic process that utilizes a serial crimping process. An initial step 80 involves the construction of an optical device 20 with lenses, spacers, prisms, windows and other optical elements in a housing such as shown in FIGS. 3 and 4. Step 81 aligns the optical device 20 with a first face of a first lens, as a selected lens, at a crimping tool represented by arrows 82. In this case a lens 83, like the doublet lens 43, is selected and a first face 84 is aligned with a crimping tool 82. At step 85 the crimping tool is applied in a plane transverse to the axis 18 thereby to form a crimp on opposite sides of the housing in the form of the tubular sheath 21 at the end portion 86 of a spacer 44. In step 87 the optical device 20 and crimping tool are repositioned so the crimping tool aligns with the second face 97 of the selected lens; i.e., at a position represented by arrows 90. Step 91 then repeats the crimping process.

If the optical device 20 contains additional lenses, step 92 transfers control to step 93 thereby to align the crimping tool with the face of a next lens, as a selected lens and as represented by arrows 94 in FIG. 10. Control then passes back to steps 85, 87 and 91 to produce a first crimp at the position of arrows 94 and a second crimp at the position of arrows 95. When this process has been completed for each lens element, the process is completed and step 92 transfers to end the serial crimping process at step 96.

Crimping at steps 85 and 91 normally occurs at diametrically opposed positions. Steps 85 and 91 might also include multiple crimping operations at each alignment position. For example, a first crimping operation might produce crimps that are vertically aligned and the second crimping operation might produce crimps angularly displaced 90° from the first crimps. Further other crimping tools or tooling could be used to produce the appropriate crimps either in sequence or in parallel as might be obtained by a special crimping tool that could produce equal radial pressures from multiple radial angles.

FIG. 11 depicts an optical device 20 with four diametrically opposed crimp portions 100 and 101 being produced by two manual crimping operations. As also shown particularly in FIG. 10, if spacers 44 are used for initial positioning, they also will be deflected at each of the crimps, such as at the crimps 100 and 101 in FIG. 11.

Each crimping operation is controlled to produce a crimp with a depth to assure that the crimp portion overlies a portion of the lens face, such as the lens face 84. However, the crimp should be limited so as not to rupture the material thereby to preserve the integrity of any sealed structure. It should also be limited so no structures extend into the field of view. In whatever arrangement the crimps conform the housing or tubular sheath to the geometry of the first and second faces, such as faces 84 and 97, adjacent a peripheral surface of each doublet lens 83 to lock the doublet lens 83 along the axis 18.

Figure 12:
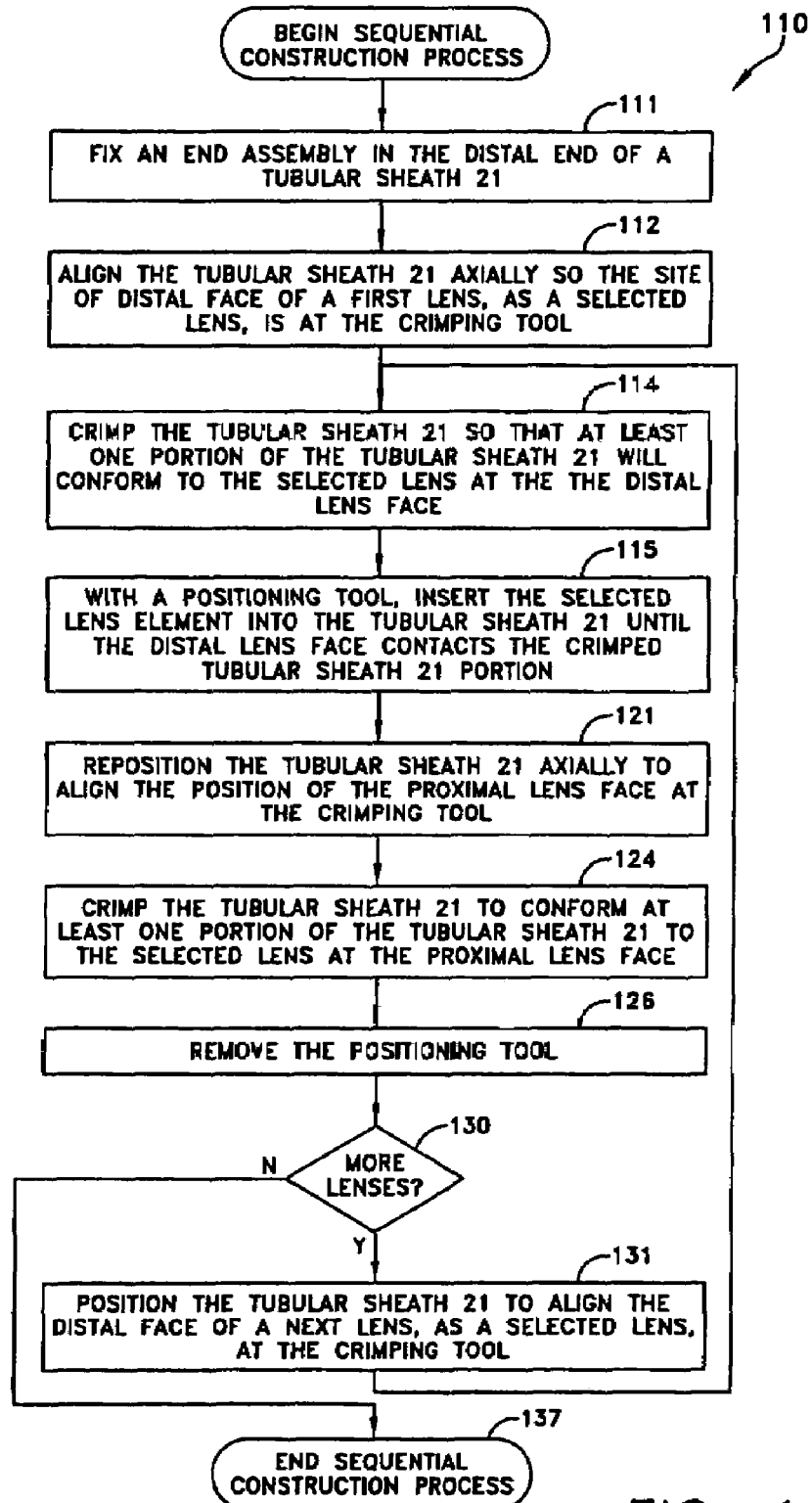
FIG. 12 is a flow diagram depicting sequential construction for manufacturing an optical device in accordance with this invention.
Figure 13:
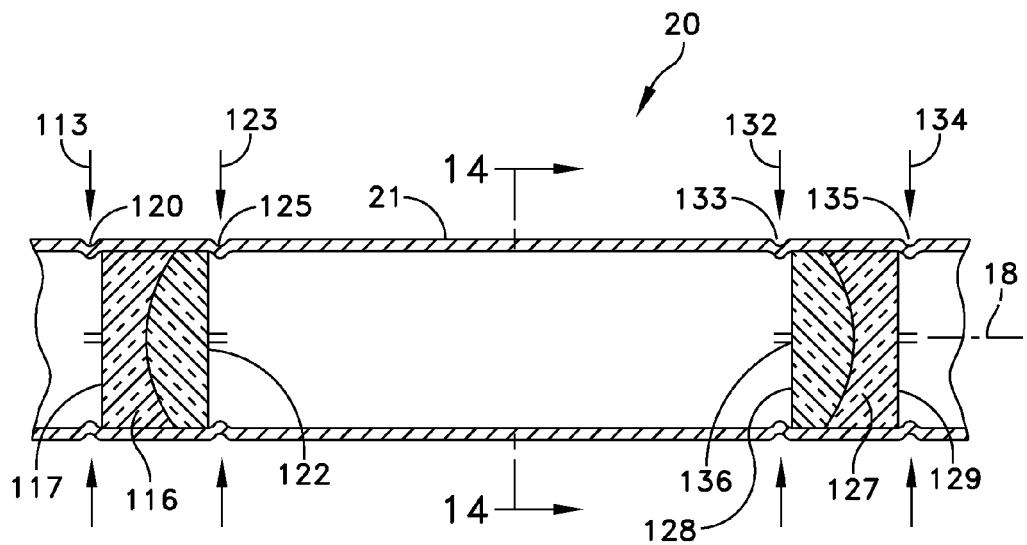
FIG. 13 is a longitudinal cross-section of an optics device similar to that shown in FIG. 2 after being subjected to the sequential construction process of FIG. 12.
Figure 14:
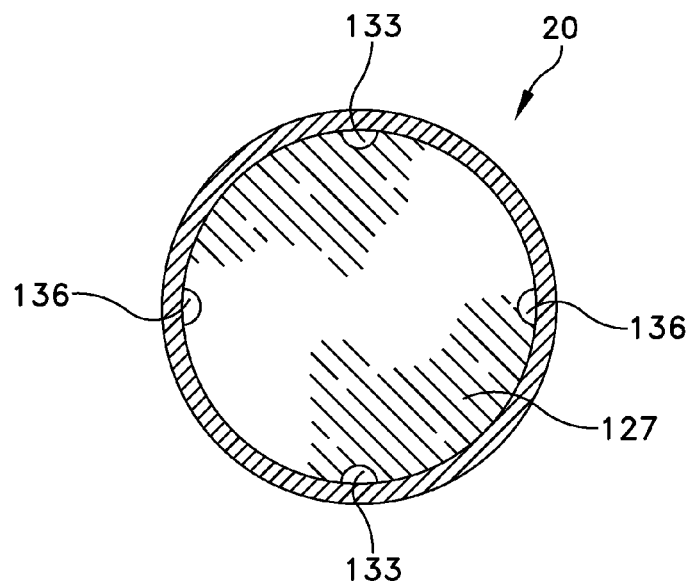
FIG. 14 is a cross-section view taken along lines 14-14 in FIG. 13.

FIGS. 12 through 14 depict a structure for producing a similar construction as shown in FIGS. 10 and 11 but without the requirement for spacers 44. In accordance with this embodiment, the process 110 of FIG. 12 begins by fixing an end of the optical device 20 in a distal end of a housing in the form of the tubular sheath 21 in step 111. For example if the structure is to be assembled by inserting devices from the proximal end of an endoscope, step 111 would be accomplished by positioning an objective lens structure in the distal end.

Step 112 then aligns the tubular sheath 21 axially so that the site of a distal face of a first lens, as a selected lens, is at the crimping tool. This is represented by arrows 113 in FIG. 13. At step 114 one or more crimping operations produce crimped portions that conform portions of the tubular sheath 21 to the selected lens at the distal lens face.

At step 115 a lens element such as lens element 116 is inserted into the tubular sheath usually with a lens positioning tool. The lens element is advanced until a distal lens face 117 contacts the crimped housing portions 120.

Step 121 then repositions the tubular sheath 21 axially to align a proximal end face 122 of the lens 116 at the crimping tool, as represented by arrows 123. Another crimping operation at step 124 conforms portions of the tubular sheath 21 at the proximal lens face in crimps 125. In step 126 any positioning tool used in step 115 can be removed. The lens 116 is then held accurately in position on the optical axis 18 and normally to the axis 18.

FIG. 13 depicts another lens element 127 with a distal lens face 128 and a proximal lens face 129. Consequently step 130 in FIG. 12 transfers control to step 131 that positions the tubular sheath 21 to align the distal face of a next lens as a selected lens at the crimping tool represented by arrows 132. Control then passes back to step 114 to form initial crimps 133 after which a positioning tool can be used to insert the lens 127 until the distal face 128 contacts the crimps 133. Then the crimping tool can be repositioned to a location corresponding to arrows 134 to produce crimps at the proximal lens face 129.

When all the lens elements are positioned in accordance with steps 114 through 126, step 130 transfers control to terminate the operation at step 137.

In accordance with this embodiment, the foregoing operations produce four equiangularly spaced crimps about the circumference of the tubular sheath 21 at each lens face. FIG. 14 particularly depicts first diametrically opposed crimps 133 that engage the distal face 128 of the lens 127. A second crimping operation produces diametrically opposed crimps 136 at right angles.

FIG. 3 depicts an optical device 10 in which each spacer 44 bears against opposing lens faces. FIG. 15 depicts an alternative approach by which each lens spacer acts as an optical support means and carries a lens element at a predetermined position. For example, FIG. 15 depicts a lens element 140 with first and second lens faces 141 and 142. A spacer 143 carries the lens element 140 as a subassembly or lens module. In this particular application after the lens element is positioned axially in the spacer 143, crimping operations produce crimp sets 144 and 145 thereby to lock the lens element 140 within the spacer 143 with an intermediate spacer portion 146 between the crimps 144 and 145 engaging a peripheral surface 147 of the lens element 140 and produce a module 148. Construction of an optics subassembly such as subassembly 144, shown in FIG. 16 then involves using a tubular sheath, such as a tubular sheath 21, and, after positioning an end element, such as an objective, inserting modules, such as modules 148A and 148B, as shown in FIG. 15 having appropriate dimensions into the tube in sequence to produce a relay lens system. As will be apparent while the approach in FIG. 15 can be used for a relay lens system, it can also be used for the formation of an objective or the formation of an eyepiece.

Each crimping operation shown in FIGS. 9 through 14 requires certain controls, particularly the depth of each crimp. Mechanical stops on a tool can provide that control. The operation and controls of such processes are well within the knowledge of persons of ordinary skill in the art.

FIGS. 17 through 19 depict still another form of optical device incorporating this invention that is readily adapted for endoscopes, particularly autoclavable endoscopes. As shown in these figures, an optical module 150 extends along a device axis 18 that, in this particular embodiment, is the optical axis. The module 150 includes an optical element 151 and conformed tube 152 that positions the optical element 151. For purposes of explanation, the optical element 151 in FIGS. 17 through 19 is a doublet lens with lenses 151A and 151B. The conformed tube 152 comprises two shells 152A and 152B.

Referring specifically to the shell 152A, an intermediate portion 153 is axially coextensive with the optical element 151 and has a radius about the axis 18 such that it conforms to portions of the optical element 151. End extensions 154 and 155 have a slightly reduced radius to produce radial transitions 156 and 157, respectively with the intermediate portion 153. The transitions 156 and 157 overlap the outer edge of the optical element 151 thereby to produce positive axial positioning within the sub-assembly 150 by conforming to the geometry of the faces 160 and 161 of the optical element 151 adjacent the peripheral surface 162.

Each of the shells 152A and 152B have, for the cylindrical lens set 151, an outer circumference that is less than half the circumference of the lens set 151 such that gaps 163 and 164 exist between the shells 152A and 152B. The module 150 shown in FIG. 19 can then be slid into an outer structure, such as the tubular sheath 21 in FIGS. 17 and 18. The outer diameter of the intermediate portion 153 corresponds to the inner diameter of the sheath 21 so that the module 150 slides within the sheath 21 during assembly. The fit of the module 150 in the sheath 21 produces sufficient friction to prevent unwanted axial displacement during use. Thus the sheath 21 also prevents any outward radial displacement of the shells 152A and 152B. In addition the axial extent of the intermediate portions 153 is sufficient to prevent the module 150 from skewing within the tubular sheath 21.

The conformal tube 152 is readily manufactured through a number of diverse manufacturing processes. For example, each of the shells, such as shell 152A, can be formed from thin metal sheets to the requisite profile in a die precision machine with mating precision dies. Another approach is to incorporate a single precision machine die and a press with a deformable material for engaging the sheet. Still in another approach it is possible to form one of the shells, such as the shell 152A, in a precision die press, load the lens set, such as the optical element 151 into the conformed shell 152A and then form another thin metal sheet about the optical element 151 by applying pressure through a press with a deformable material such as RTV.

The conformal tube approach described with respect to FIGS. 17 through 19 has a number of advantages. The conformed tubes 152 can be assembled without the need to slide the individual lenses along the tube walls with an attendant difficulty maintaining cleanliness. The use of these conformed tubes 152 can also provide greater production throughput, improve costs and accuracy in axially positioning. Moreover, such a structure is compatible with automated equipment.

What has been disclosed are alternate methods for forming optical devices in which optical elements are disposed with accurate axial placement. These various structures are characterized by having crimped or deformed portions of a support that overlaps portions of each face of an optical element to capture the optical element in the support. Examples of processes using hydrostatic process, conventional crimping and machining operations have been disclosed. These are by way of example only. It will be apparent that many modifications can be made to the disclosed apparatus without departing from the invention. Therefore, it is the intent of the appended claims to cover all such variations and modifications as come within the true spirit and scope of this invention.

The invention claimed is:

1. An optical device characterized by an axis and comprising:
   A) an optical element on the axis including first and second faces and an intermediate peripheral surface, and
   B) an integral optical element support extending along the axis for defining a positive seat for said optical element, said support including:
      i) a first portion at an intermediate axial location of said support that engages said optical element peripheral surface, and
      ii) second, plastically deformed, spaced portions adjacent opposite ends of said first portion for engaging each of said first and second faces adjacent said peripheral surface whereby said first and second portions lock said optical element at the intermediate location in said optical device and limit motion of said optical element along the axis.

2. An optical device as recited in claim 1 wherein said first portion conforms to the geometry of said peripheral surface and said second portions conform to adjacent portions of said first and second faces.

3. An optical device as recited in claim 2 wherein said first portion includes an intermediate portion of a housing means for engaging said peripheral surface and said second portions include spaced crimped portions of said housing means for conforming said housing means to the geometry of said first and second faces adjacent said peripheral surface.

4. An optical device as recited in claim 2 wherein said first portion includes an intermediate portion of a housing means for engaging said peripheral surface and said second portions being constituted by deformed portions that conform to the geometry of said first and second faces adjacent to and about said peripheral surface.

5. An optical device as recited in claim 2 wherein said support includes first and second axially extending shells, each said shell having a said first portion for engaging said peripheral surface and having second plastically deformed transitions overlying said first and second faces adjacent said peripheral surface.

6. An optical device as recited in claim 5 including means for capturing said first and second shells.

7. An optical device characterized by an axis and comprising:
   A) a lens set comprising at least one lens element located on the axis, said lens set including first and second faces and an intermediate peripheral surface, and
   B) lens set support means for defining a positive seat for said lens set, said support means including first portion means for engaging said peripheral surface and second plastically deformed portion means for engaging each of said first and second faces adjacent said peripheral surface whereby said lens set is locked in said optical device to limit motion along the axis.

8. An optical device as recited in claim 7 wherein said first portion means conforms to the geometry of said lens set peripheral surface and said second portion means conform to adjacent portions of said first and second faces.

9. An optical device as recited in claim 8 wherein said lens set peripheral surface is cylindrical and said first portion means that is coextensive with said peripheral surface engages said peripheral surface.

10. An optical device as recited in claim 9 wherein said first portion means includes an intermediate portion of a cylindrical housing for engaging said peripheral surface and each of said portion means includes angularly spaced crimps of said housing that overlie portions of said first and second faces adjacent said peripheral surface.

11. An optical device as recited in claim 9 wherein said first portion means includes an intermediate portion of a cylindrical housing for engaging said lens set peripheral surface and each of said second portion means includes plastically deformed circumferentially extending portions of said housing that conform said housing to the geometry of said first and second faces adjacent to and about said peripheral surface.

12. An optical device as recited in claim 9 wherein said lens set support means includes first and second axially extending shells each having an intermediate first portion means of a first radius for engaging said lens set peripheral surface and second portion means include oppositely extending portions having a second radius less than the first radius thereby to overlie said first and second faces adjacent said peripheral surface and plastically deformed transition portions between said intermediate first portions means and each of said oppositely extending portions that conform to the geometry of said first and second faces adjacent said peripheral surface wherein each of said first and second shells includes said first and second portion means.

13. An optical device as recited in claim 12 including an outer housing for capturing said first and second shells.

14. An endoscope comprising a plurality of optical elements formed as optical modules, each of said optical modules comprising:
  A) a set of at least one optical element taken from the group of lenses, spacers, windows and prisms located on an axis, said optical element set including first and second faces and an intermediate peripheral surface, and
  B) optical element support means extending along the axis for defining a positive seat for said optical element set, said support means including first portion means for engaging said optical element set intermediate peripheral surface and second plastically deformed portion means for engaging said first and second optical element set faces adjacent said peripheral surface whereby said optical element is locked in said optical module to limit motion along the axis.

15. An endoscope as recited in claim 14 wherein said first portion means conforms to the geometry of said optical element set peripheral surface and each of said second portion means conforms to an adjacent portion of said first and second optical element set faces.

16. An endoscope as recited in claim 15 wherein said optical element set peripheral surface is cylindrical and portions of said first portion means that are coextensive with said peripheral surface engage said peripheral surface.

17. An endoscope as recited in claim 16 wherein said first portion means includes an intermediate portion of a cylindrical housing for engaging said optical element set peripheral surface and each of said second portion means includes angularly spaced crimps of said housing that overlie portions of said first and second optical element set faces adjacent said optical element set peripheral surface.

18. An endoscope as recited in claim 16 wherein first portion means includes an intermediate portion of a cylindrical housing for engaging said optical element set peripheral surface and each of said second portion means includes plastically deformed circumferentially extending portions of said housing for conforming said housing to the geometry of said first and second optical element set faces adjacent to and about said optical element set peripheral surface.

19. An endoscope as recited in claim 16 wherein said optical element support means includes first and second axially extending shells each having a first portion means of a first radius for engaging said optical element set peripheral surface and second portion means formed in oppositely extending portions of said shells with a second radius less than the first radius whereby said second portion means overlie said first and second faces adjacent said optical element set peripheral surface and wherein each of said second portion means includes plastically deformed transitions between said first portion means and each of said oppositely extending portions that conform to the geometry of said first and second optical element set faces adjacent said optical element set peripheral surface wherein each of said first and second shells includes said first and second portion means.

20. An endoscope as recited in claim 19 including an outer housing for capturing said first and second shells.

21. An endoscope comprising a cylindrical sheath, objective lens means at a distal end for forming an image, relay lens means for transferring the image from said objective lens means toward a proximal end and eyepiece means at said proximal end for providing the image for viewing wherein at least one of said objective lens means, relay lens means and eyepiece means comprises an optical module for being located within the sheath and wherein each said optical module comprises:
  A) a lens set of at least one lens element for directing the image along an axis, said lens set being characterized by a lens set cylindrical peripheral surface and two lens set faces oriented transversely to the axis,
  B) a support means extending along the axis having a first support portion for engaging said lens set cylindrical peripheral surface and second support portions extending from said first support portion that include plastically deformed sections that conform to said lens set faces adjacent said lens set peripheral surface whereby said second support portions lock said lens set to limit axial motion thereof.

* * * * *